US009938447B2

(12) United States Patent
Michaux et al.

(10) Patent No.: US 9,938,447 B2
(45) Date of Patent: Apr. 10, 2018

(54) COMPOSITIONS AND METHODS FOR COMPLETING SUBTERRANEAN WELLS (71) Applicant: Schlumberger Technology Corporation, Sugar Land, TX (US)

(72) Inventors: Michel Michaux, Verrieres-le-Buisson (FR); Jean-Philippe Caritey, Le Plessis Robinson (FR); Laurent Gabilly, Malakoff (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/344,910

(22) PCT Filed: Oct. 25, 2012

(86) PCT No.: PCT/EP2012/071187
§ 371 (c)(1),
(2) Date: Mar. 14, 2014

(87) PCT Pub. No.: WO2013/060799
PCT Pub. Date: May 2, 2013

(65) Prior Publication Data
US 2014/0367103 A1 Dec. 18, 2014

(30) Foreign Application Priority Data

Oct. 28, 2011 (EP) .................................... 11306404
May 31, 2012 (EP) .................................... 12305607

(51) Int. Cl.
C09K 8/42 (2006.01)
C09K 8/24 (2006.01)
(Continued)

(52) U.S. Cl.
CPC ................. *C09K 8/24* (2013.01); *C09K 8/40* (2013.01); *C09K 8/424* (2013.01); *C09K 8/46* (2013.01); *E21B 33/13* (2013.01)

(58) Field of Classification Search
CPC ....................................................... C09K 8/40
See application file for complete search history.

(56) References Cited

U.S. PATENT DOCUMENTS 2,650,905 A * 9/1953 Fordyce .................. C09K 8/24
507/122
3,754,953 A 8/1973 Martin
(Continued)

FOREIGN PATENT DOCUMENTS

EP 0207536 1/1987
EP 0273471 7/1988
(Continued)

OTHER PUBLICATIONS

"High-Pressure, High-Temperature Technologies," Schlumberger Oilfield Review, Autumn 2008, p. 46-60.*
(Continued)

*Primary Examiner* — Angela M DiTrani
*Assistant Examiner* — Andrew Sue-Ako
(74) *Attorney, Agent, or Firm* — Andrea E. Tran (57) ABSTRACT Spacer fluids that are stable at temperatures up to at least 260° C. comprise water, polystyrene sulfonate and a mixture of particulate materials. The particulate materials may be chosen such that the mixture has at least a trimodal particle-size distribution. The fluids may further comprise inorganic clays, mutual solvents and surfactants.

16 Claims, 7 Drawing Sheets (51) Int. Cl.
*C09K 8/40* (2006.01)
*C09K 8/46* (2006.01)
*E21B 33/13* (2006.01)

(56) References Cited

U.S. PATENT DOCUMENTS

| | | |
|---|---|---|
| 3,856,541 A | 12/1974 | Martin |
| 4,098,613 A | 7/1978 | Maravilla et al. |
| 4,601,758 A | 7/1986 | Nelson |
| 5,101,902 A | 4/1992 | Parcevaux et al. |
| 5,518,996 A | 5/1996 | Maroy et al. |
| 5,806,594 A | 9/1998 | Stiles et al. |
| 6,312,515 B1 | 11/2001 | Barlet-Gouedard et al. |
| 2004/0238170 A1* | 12/2004 | Fanguy, Jr. ............ C04B 28/02 166/291 |
| 2006/0086499 A1* | 4/2006 | Badalamenti ....... E21B 47/0005 166/250.14 |
| 2010/0025039 A1 | 2/2010 | Roddy et al. |
| 2010/0300688 A1* | 12/2010 | Panga ..................... C09K 8/80 166/280.2 |
| 2010/0311619 A1* | 12/2010 | Mettath .................. C09K 8/32 507/120 |

FOREIGN PATENT DOCUMENTS

| | | |
|---|---|---|
| EP | 0621330 | 10/1994 |
| GB | 2382363 | 5/2003 |

OTHER PUBLICATIONS

"Sulfonated Polystyrene Polymers: Product guide and product features," Versa® Products, AkzoNobel, 2011.*
G. Daccord, et al, "Mud Removal," in Nelson EB and Guillot D (eds.): Well Cementing—2nd Edition, Houston, Schlumberger (2006) pp. 143-189.
EB Nelson, et al, "Special Cement Systems," in Nelson EB and Guillot D (eds.): Well Cementing—2nd Edition, Houston, Schlumberger (2006) pp. 233-268.

* cited by examiner

COMPOSITIONS AND METHODS FOR COMPLETING SUBTERRANEAN WELLS

BACKGROUND

The statements in this section merely provide background information related to the present disclosure and may not constitute prior art.

This disclosure relates to compositions and methods for completing subterranean wells, in particular, fluid compositions and methods for completion operations during which the fluid compositions are pumped into a wellbore and make contact with subterranean rock formations.

In the course of completing oil and gas wells and the like, various types of fluids are circulated in the wellbore. These fluids include, but are not limited to, drilling fluids, spacer fluids, cement slurries and gravel-packing fluids. In addition, these fluids typically contain solid particles.

Cement slurries are usually incompatible with most drilling fluids. If the cement slurry and drilling fluid commingle, a highly viscous mass may form that can cause several problems. Cement slurry can channel through the viscous mass. Unacceptably high friction pressures can develop during the cement job. Plugging of the annulus can result in job failure. In all of these situations, zonal isolation may be compromised, and expensive remedial cementing may be required.

Consequently, intermediate fluids called preflushes are often pumped as buffers to prevent contact between cement slurries and drilling fluids. Preflushes can be chemical washes that contain no solids or spacer fluids that contain solids and can be mixed at various densities.

Chemical washes are preflushes with a density and a viscosity very close to that of water or oil. The simplest chemical wash is fresh water; however, for more efficient drilling-fluid thinning and dispersion, chemical washes that contain dispersants and surfactants are more commonly used.

Spacers are preflushes with carefully designed densities and rheological properties. Spacers are more complicated chemically than washes. Viscosifiers are necessary to suspend the solids and control the rheological properties, and usually comprise water-soluble polymers, clays or both. Other chemical components include dispersants, fluid-loss control agents, weighting agents and surfactants. A thorough discussion concerning the uses and compositions of preflushes may be found in the following publication. Daccord G, Guillot D and Nilsson F: "*Mud Removal*," in Nelson E B and Guillot D (eds.): *Well Cementing*-$2^{nd}$ Edition, Houston: Schlumberger (2006) 183-187.

For optimal fluid displacement, the density of a spacer fluid should usually be higher than that of the drilling fluid and lower than that of the cement slurry. Furthermore, the viscosity of the spacer fluid is usually designed to be higher than the drilling fluid and lower than the cement slurry. The spacer fluid must remain stable throughout the cementing process (i.e., no free-fluid development and no sedimentation of solids). In addition, it may be necessary to control the fluid-loss rate.

As well depth increases, the formation temperature and pressure also increase. Consequently, to maintain well control and prevent invasion of formation fluids into the wellbore, the hydrostatic pressure exerted by the drilling fluid, spacer fluid and cement slurry must be higher than or equal to the formation pressure. In deep wells, it is often necessary to prepare fluids with densities between 2037 kg/m$^3$ (17 lbm/gal) and 2756 kg/m$^3$ (23 lbm/gal). In addition, the bottomhole temperature can exceed 260° C. (500° F.).

These conditions present challenges for those designing spacer fluids with optimal densities, rheological properties, stability and fluid-loss rates. Achieving high fluid densities typically requires the addition of heavy particles comprising barite, hematite, ilmenite and haussmanite. The solid volume fraction necessary to achieve high densities is also elevated. However, keeping the particles in suspension is difficult at high temperatures, possibly leading to spacer instability. It would be therefore desirable to provide means by which spacer-fluid rheological properties, stability and fluid-loss control may be better controlled at elevated temperatures.

SUMMARY

In an aspect, embodiments relate to methods for cementing a borehole in a subterranean well, the borehole being initially filled with a drilling fluid, comprising: preparing a spacer fluid comprising water, polystyrene sulfonate, and a mixture of particulate materials, the particulate materials being chosen such that the mixture has at least a trimodal particle-size distribution; pumping the spacer fluid into the well such that it displaces the drilling fluid; and pumping a cement slurry into the well such that it displaces the spacer fluid.

In a further aspect, embodiments relate to methods for fluid displacement in an annulus, the annulus being initially filled with a first fluid, comprising: preparing a second fluid comprising water, polystyrene sulfonate, and a mixture of particulate materials, the particulate materials being chosen such that the mixture has at least a trimodal particle-size distribution; and pumping the second fluid into the annulus such that it displaces the first fluid.

DETAILED DESCRIPTION

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

Without wishing to be bound by any theory, the loss of stability may result from hydrolysis or thermal degradation of the water-soluble polymers, a drop in the viscosity of the interstitial water or combinations thereof. These problems may also affect the rheological properties of the spacer, negatively affecting its fluid-displacement ability.

Controlled rheological properties, stability and fluid-loss control are important performance parameters of spacer fluids. The current application discloses compositions and uses of spacer fluids whose properties are controllable and stable at elevated temperatures.

The authors have determined that stable aqueous spacer fluids with controllable rheological properties and fluid-loss control may be prepared by adding polystyrene sulfonate and blends of particulate materials that may be chosen such that the solid mixture has at least a trimodal particle-size distribution. The spacer properties are stable throughout a wide temperature range—from ambient temperature (which would be experienced during spacer-fluid preparation at the surface) to bottomhole temperatures of at least 260° C. For the embodiments in the present disclosure, the bottomhole temperature may be higher than about 150° C.; temperatures up to 290° C. may even be envisaged.

The polystyrene-sulfonate concentration in the spacer fluid is may be between about 0.6% and 5.0% by weight of water, and may be between 1.5% and 4.0% by weight of water. Without wishing to be bound by any theory, the primary role of the polystyrene sulfonate is to disperse the solid particles and prevent fluid gelation (i.e., strong viscosification). In addition, the polymer may enhance the spacer-fluid stability, increase the fluid viscosity and provide fluid-loss control, still without wishing to be bound by any theory, the inventors believe that the molecular weight of the polystyrene sulfonate may have an impact on the fluid loss control, accordingly, when fluid loss is an issue, it would be desirable to use polystyrene sulfonate having a molecular weight of from 75,000 Daltons to 6,000,000 Daltons, or between 75,000 to 1,000,000 Daltons.

The trimodal particle-size distribution of the particulate materials allows the spacer fluid to have a higher solid-volume fraction, yet retain optimal rheological properties and stability. The solid volume fraction is the ratio between the volume of solids in a slurry and the total slurry volume. The solid volume fraction can be maximized by using coarse, medium and fine particles in specific volumetric ratios. The fine particles fit in the void spaces between the medium-size particles, and the medium-size particles fit in the void spaces between the coarse particles. For two consecutive granulometric classes, the order of magnitude between the mean particle diameter ($d_{50}$) of each class should ideally be between 7 and 10. For the disclosed spacer fluids, the average particle size of the first material may be between about 100 and 300 µm, the second material may be between about 10 and 30 µm and the third material may be between about 1 and 3 µm. The solid volume fractions of the disclosed spacer fluids may be between about 0.50 and 0.55, and may be between 0.50 and 0.52. The densities of the disclosed spacer fluids may be between 1.97 kg/m$^3$ and 2.40 kg/m$^3$. A thorough presentation concerning engineered particle size slurries may be found in the following publication. Nelson E B, Drochon B, Michaux M and Griffin T J: "*Special Cement Systems*," in Nelson E B and Guillot D (eds.): *Well Cementing-2$^{nd}$* Edition, Houston: Schlumberger (2006) 251-256.

The particulate materials may be blends that comprise silica and barite or calcium carbonate and barite. It is envisioned that additional particulate materials may also be incorporated, including hematite, ilmenite, rutile, aluminum oxide and hausmannite. Combinations of calcium carbonate (as coarse particles) and barite (as medium-size and fine particles); and combinations of crystalline silica (as coarse particles) and barite (as medium-size and fine particles) may be used.

The spacer fluid may further comprise a clay mineral. Of these, bentonite, attapulgite, laponite, or sepiolite, and mixtures thereof may be used. Without wishing to be bound by any theory, the clays may increase the yield stress of the spacer fluid, thereby enhancing fluid stability.

The spacer fluid may also further comprise a mutual solvent or one or more surfactants, or combinations thereof. Without wishing to be bound by any theory, such materials may improve compatibility between the spacer fluid and oil-base or emulsion drilling fluids.

The preceding paragraphs describing the nature of the spacer fluids shall be applicable to the following aspects of the disclosure.

In an aspect, embodiments relate to methods for cementing a borehole in a subterranean formation, wherein the borehole is initially filled with a drilling fluid. A spacer fluid is prepared that comprises water, polystyrene sulfonate, and a mixture of particulate materials, wherein the particulate materials are chosen such that the mixture has at least a trimodal particle-size distribution. The three particulate materials do not necessarily have to be different chemically. They could be the same substance, provided in three different particle sizes.

The spacer fluid is pumped into the well such that it displaces the drilling fluid. The displacement may occur during a primary cement job, wherein the spacer fluid pushes the drilling fluid out of the casing interior, up through the annular region between the casing and the formation, or the casing and another casing string, and then out of the wellbore. Or, in the case of reverse cementing, the spacer would push drilling fluid down the annulus, up through the casing interior, and out of the wellbore. The spacer fluid may also be used during remedial cementing operations, particularly plug cementing. Like primary cementing, it may be necessary to prevent commingling between the cement slurry and the drilling fluid.

The cement slurry may comprise Portland cement, calcium aluminate cement, fly ash, blast furnace slag, cement kiln dust, lime/silica blends, magnesium oxychloride, chemically bonded phosphate ceramics, zeolites, or geopolymers, or combinations thereof.

In a further aspect, embodiments relate to methods for fluid displacement in an annulus. The annulus is initially filled with a first fluid. A second fluid is prepared that comprises water, polystyrene sulfonate and a mixture of particulate materials, wherein the particulate materials are chosen such that the mixture has at least a trimodal particle-size distribution. The second fluid is pumped into the annulus such that it displaces the first fluid.

Further illustration of the disclosure is provided by the following examples.

EXAMPLES

All of the tests presented in the following examples were performed in accordance with recommended practices specified by the American Petroleum Institute (API) and the International Organization for Standards (ISO). The methods are presented in the following publication—*Petroleum and Natural Gas Industries—Cements and Materials for Well Cementing—Part 2: Testing of Well Cements*, International Organization for Standards Publication No. 10426-2.

Example 1

A particle blend was prepared that was composed of 50% by volume of solid blend (BVOB) crystalline silica (median particle size of 154 μm), 30% BVOB barite (median particle size of 17 μm), and 20% BVOB barite (median particle size of 1.5 μm. Bentonite was also added to this blend at a concentration of 0.4% BWOB. A fluid was prepared consisting of fresh water, 1.7 L/tonne of solid blend of antifoam agent (polypropylene glycol), and 33.4 L/tonne of solid blend of an aqueous solution containing 25% by weight of polystyrene sulfonate (Versa-TL™ 501 available from Akzo Nobel).

The particle blend was mixed with the fluid at a solid volume fraction (SVF) of 0.50 to prepare a spacer fluid. The spacer fluid was stirred for 35 seconds at 12,000 RPM using a Waring blender (according to the ISO/API procedure for mixing cement slurries). The density of the spacer fluid was 2229 kg/m$^3$ (18.6 lbm/gal).

The rheological properties of the spacer were measured immediately after mixing (at 25° C.), and after a 20-min conditioning period at 85° C. in an atmospheric consistometer rotating at 150 RPM. A Chan 35™ rheometer (available from Chandler Engineering, Tulsa, Okla., USA) was used. The RIBS rotor/bob geometry was necessary due to the presence of coarse particles. The results, presented in Table 1, show that the spacer was well dispersed after mixing and after the 20-minute conditioning period at 85° C. No settling was noted at the bottom of the rheometer cup.

TABLE 1

Rheological data after mixing and after a 20-minute conditioning period at 85° C.

| | Speed | | | | | | |
|---|---|---|---|---|---|---|---|
| | 300 RPM | 200 RPM | 100 RPM | 60 RPM | 30 RPM | 6 RPM | 3 RPM |
| 25° C. | 72 | 50 | 27 | 17.5 | 10 | 3 | 2 |
| 85° C. | 36 | 26.5 | 15.5 | 11 | 6.5 | 2.5 | 2 |

The amount of free fluid and the density gradient (difference between the density at the top of the cell and the density at the bottom of the cell divided by the average density) were measured after 2 hours at 85° C. Fluid-loss measurements were performed at 204° C., 232° C., and 260° C., using a stirred fluid-loss cell (90-min heat-up time). The differential pressure was 6.9 MPa and the filtration medium was a 325-mesh screen. Results are presented in Table 2.

TABLE 2

Free fluid and density gradient at 85° C., and fluid loss at 204° C., 232° C. and 260° C.

| Free Fluid (%) | Density Gradient (%) | ISO/API Fluid Loss (mL/30 min) | | |
|---|---|---|---|---|
| | | At 204° C. | At 232° C. | At 260° C. |
| 0 | 0.2 | 114 | 155 | 203 |

These results show that the spacer was very stable at 85° C. The fluid loss increased with temperature, but was nonetheless acceptable at temperatures as high as 260° C.

The density gradient was also measured at 204° C. and 260° C. after conditioning the spacer in a stirred fluid-loss cell. The heat-up time was 90 minutes, and the spacer remained at the test temperature for 45 minutes (30 minutes under agitation at 150 RPM and then 15 minutes under static condition). The spacer was left under static condition during the cooling period, and the density gradient was measured at room temperature. The results, shown in Table 3, showed that the spacer conditioned at 204° C. was very stable. The density gradient was higher at 260° C., but was acceptable. In both cases the amount of free fluid at the top of the spacer column was negligible.

TABLE 3

Density gradient at 204° C. and 260° C.
Density Gradient (%)

| 204° C. | 260° C. |
|---------|---------|
| 0.7     | 4.7     |

Figure 1:
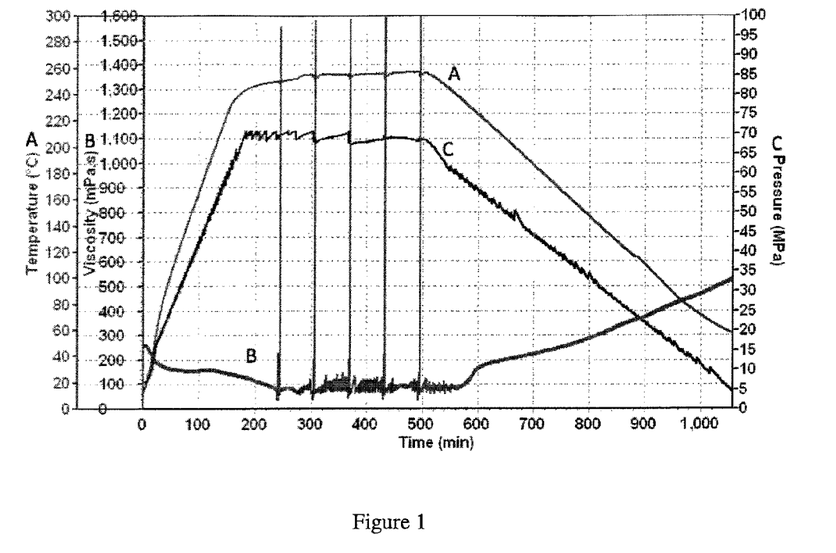
FIG. 1 shows the viscosity versus time and temperature for a spacer fluid in which the particulate materials comprised crystalline silica, barite and bentonite.

The viscosity of the spacer fluid was measured at 254° C. and 69 MPa (10,000 psi) using a Chandler 7600 rheometer (RIBS geometry). The heat-up time was about 4 hours, and the spacer remained at this temperature for 4 hours. The viscosity was recorded continuously at 100 RPM, corresponding to a shear rate of 84 s$^{-1}$. The viscosity curve is shown in FIG. 1. The rheometer readings, shown in FIG. 2, were recorded after 4, 5, 6, 7, and 8 hours (corresponding to the vertical lines on the viscosity curve in FIG. 1), varying the rotational speed between 3 and 300 RPM.

Figure 2:
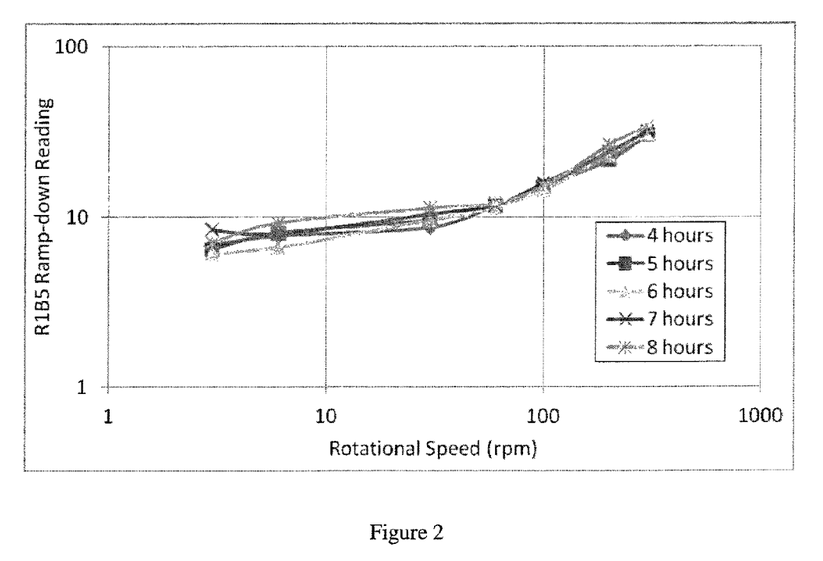
FIG. 2 shows the rheological behavior of the spacer fluid of FIG. 1 during an 8-hour heating period at 254° C. and 69 MPa.

These data show that the viscosity of the spacer decreased during the heating period, but did not change significantly with time when the spacer was left at 254° C. and (69 MPa) 10,000 psi. The spacer did not become gelled (as evidenced by the low yield stress), nor was the spacer overdispersed (the yield stress was above zero).

Example 2

A blend composed of 50% BVOB (by volume of blend) crystalline silica (median particle size of 154 μm), 30% BVOB barite (median particle size of 17 μm), and 20% BVOB barite (median particle size of 1.5 μm) was prepared. 0.4% BWOB (by weight of blend) bentonite was added to this blend.

A fluid containing fresh water, 1.7 L/tonne of blend of antifoam agent (polypropylene glycol), 33.4 L/tonne of blend of an aqueous solution containing 25% by weight of polystyrene sulfonate (Versa-TL™ 501 available from Akzo Nobel), 25 L/tonne of blend of mutual solvent (ethylene glycol monobutyl ether), and 25 L/tonne of blend of surfactant (EZEFLO™ available from Schlumberger) was prepared.

The solid blend was mixed with the fluid at a solid volume fraction of 0.52. The spacer was stirred for 35 seconds at 12,000 RPM using a Waring blender (ISO/API procedure for mixing cement slurries). The density of the spacer was 2271 kg/m$^3$ (18.95 lbm/gal). The rheological properties of the spacer were measured after mixing (at 25° C.) and after a 20-minute conditioning period at 85° C. in an atmospheric consistometer rotating at 150 RPM. A Chan 35™ rheometer was used. The RIBS rotor/bob geometry was necessary due to the presence of coarse particles. Results are presented in Table 4.

These results show that the spacer was well dispersed after mixing and after the 20-minute conditioning period at 85° C. No settling was noted at the bottom of the rheometer cup. The amount of free fluid and the density gradient (difference between the density at the top of the cell and the density at the bottom of the cell divided by the average density) were measured after 2 hours at 85° C. The fluid loss was measured at 260° C. and 6.9 MPa using a stirred fluid-loss cell equipped with a 325-mesh screen (90-min heat-up time). Results are reported in Table 5.

TABLE 5

Free fluid and density gradient at 85° C., and fluid loss at 260° C.

| Free Fluid (%) | Density Gradient (%) | ISO/API Fluid Loss (mL/30 min) |
|----------------|----------------------|--------------------------------|
| 0              | 1.1                  | 115                            |

The results show that the spacer was very stable at 85° C. The fluid loss measured at 260° C. was low, demonstrating that the polystyrene sulfonate remains effective at this temperature.

The density gradient was also measured at 260° C. after conditioning the spacer in a stirred fluid-loss cell. The heat-up time was 90 minutes, and the spacer remained at the test temperature for 45 minutes (30 minutes under agitation at 150 RPM and then 15 minutes under static condition). The spacer was left under static condition during the cooling period, and the density gradient was measured at room temperature. The density gradient was only 2.9%, showing that the spacer conditioned for 45 minutes at 260° C. remained stable.

Figure 3:
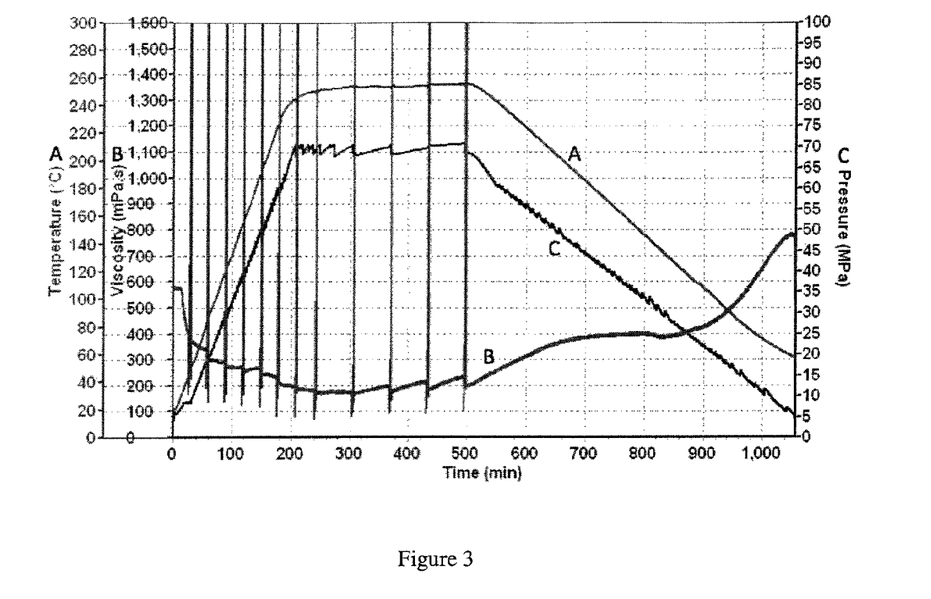
FIG. 3 shows the viscosity versus time and temperature for a spacer fluid in which the particulate materials comprised crystalline silica, barite and bentonite. The fluid further comprised a mutual solvent and a surfactant.

The rheological properties were measured at 254° C. and 69 MPa (10,000 psi) using a Chandler 7600 rheometer using the RIBS geometry. The heat up time was about 4 hours, and the spacer remained at this temperature for 4 hours. The viscosity was continuously recorded at 100 RPM, corresponding to a shear rate of 84 s$^{-1}$. The viscosity curve is shown in FIG. 3. These data show that the viscosity of the spacer decreased during the heating period, and then did not change significantly with time at 254° C. and 69 MPa (10,000 psi).

Figure 4:
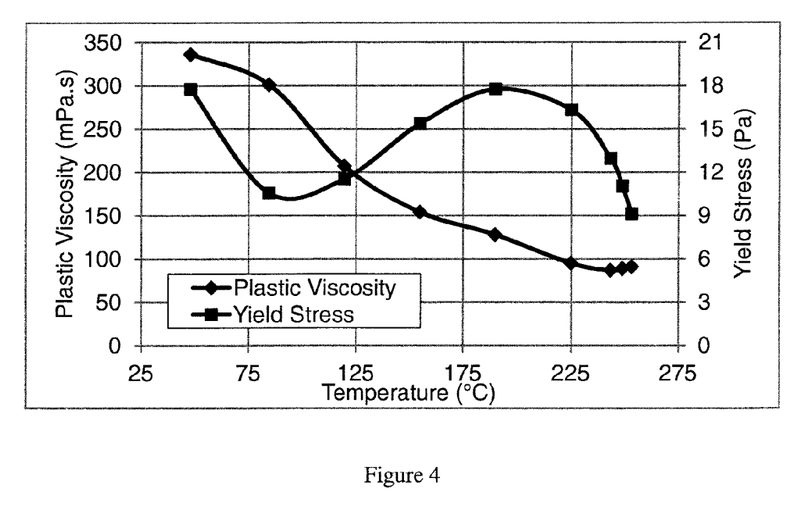
FIG. 4 shows the plastic viscosity and yield stress versus temperature of the spacer fluid of FIG. 3.

The rheological properties were measured after different times (corresponding to the vertical lines on the viscosity curve in FIG. 3), and the plastic viscosity and yield stress were calculated using the Bingham plastic model. The evolution of these parameters as a function of temperature is shown in FIG. 4. The plastic viscosity continuously decreased during the heating period. The yield stress varied from about 9.12 Pa (19 lbf/100 ft$^2$) to about 17.8 Pa (37 lbf/100 ft$^2$) depending on the temperature. At 254° C. the plastic viscosity was about 90 MPa-s (90 cP) and the yield stress was about 9.12 Pa (19 lbf/100 ft$^2$). The rheological

TABLE 4

Rheological data after mixing and after a 20-minute conditioning period at 85° C.

Figure 5:
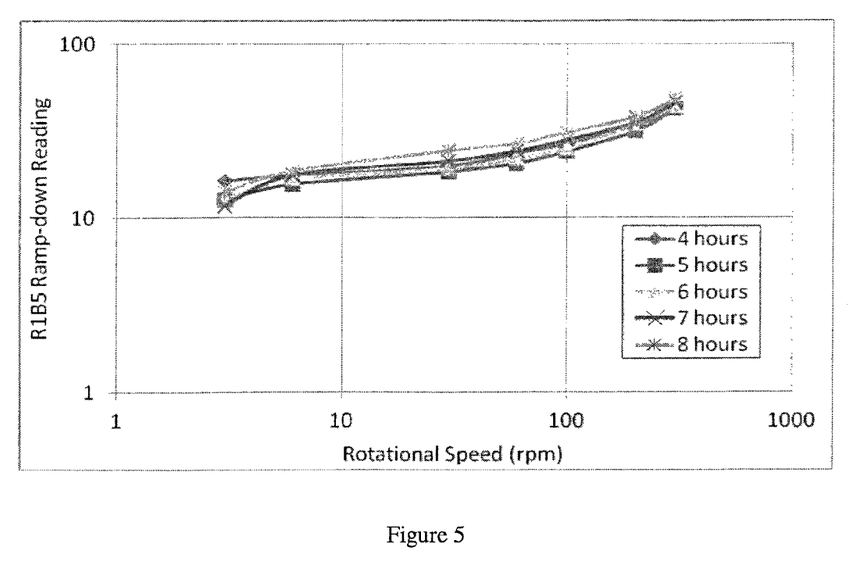
FIG. 5 shows the rheological behavior of the spacer fluid of FIG. 3 during an 8-hour heating period at 254° C. and 69 MPa.

| | Speed | | | | | | |
|---|---|---|---|---|---|---|---|
| | 300 RPM | 200 RPM | 100 RPM | 60 RPM | 30 RPM | 6 RPM | 3 RPM |
| At 25° C. | 213 | 154 | 86.5 | 57 | 32.5 | 9.5 | 6 |
| At 85° C. | 137 | 100 | 60 | 41.5 | 26 | 10 | 7.5 | properties did not change significantly when the spacer was left for 4 hours at 254° C. and 69 MPa (10,000 psi) (FIG. 5).

Figure 6:
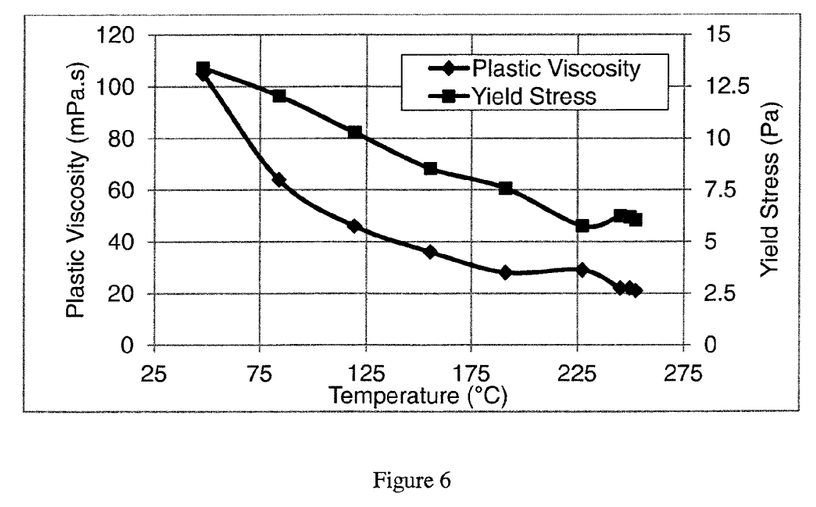
FIG. 6 shows the plastic viscosity and yield stress versus temperature for a oil-base mud.

The evolution of the plastic viscosity and yield stress of an oil-base mud as a function of temperature is shown in FIG. 6. The oil-base mud was obtained from M-I SWACO, Houston, Tex. The density of the mud was 2271 kg/m$^3$ (18.95 lbm/gal). At 254° C., the plastic viscosity was about 20 cP and the yield stress was about 6.0 Pa (12.5 lbf/100 ft$^2$). FIGS. 4 and 6 show that the plastic viscosity and yield stress of the spacer are higher than that of the oil-base mud. Therefore, the rheological properties of the spacer are adequate to displace this mud.

Example 3

A blend composed of 50% BVOB (by volume of blend) calcium carbonate (median particle size of 146 μm), 30% BVOB barite (median particle size of 17 μm), and 20% BVOB barite (median particle size of 1.5 μm) was prepared. 0.4% BWOB (by weight of blend) bentonite was added to this blend.

A fluid containing fresh water, 1.7 L/tonne of blend of antifoam agent (polypropylene glycol), 33.4 L/tonne of blend of an aqueous solution containing 25% by weight of polystyrene sulfonate (Versa-TL™ 501 available from Akzo Nobel), 25 L/tonne of blend of mutual solvent (ethylene glycol monobutyl ether), and 25 L/tonne of blend of surfactant (EZEFLO™ available from Schlumberger) was prepared.

The solid blend was mixed with the fluid at a solid volume fraction of 0.52. The spacer was agitated for 35 seconds at 12,000 RPM using a Waring blender (ISO/API procedure for mixing cement slurries). The density of the spacer was 2284 kg/m$^3$ (19.06 lbm/gal).

The rheological properties of the spacer were measured after mixing (at 25° C.) and after a 20-minute conditioning period at 85° C. in an atmospheric consistometer rotating at 150 RPM. A Chan 35™ rheometer was used. The RIBS geometry was necessary due to the presence of coarse particles. The results, shown in Table 6, show that the spacer was well dispersed after mixing and after the 20-minute conditioning period at 85° C. No settling was noted at the bottom of the rheometer cup.

Figure 7:
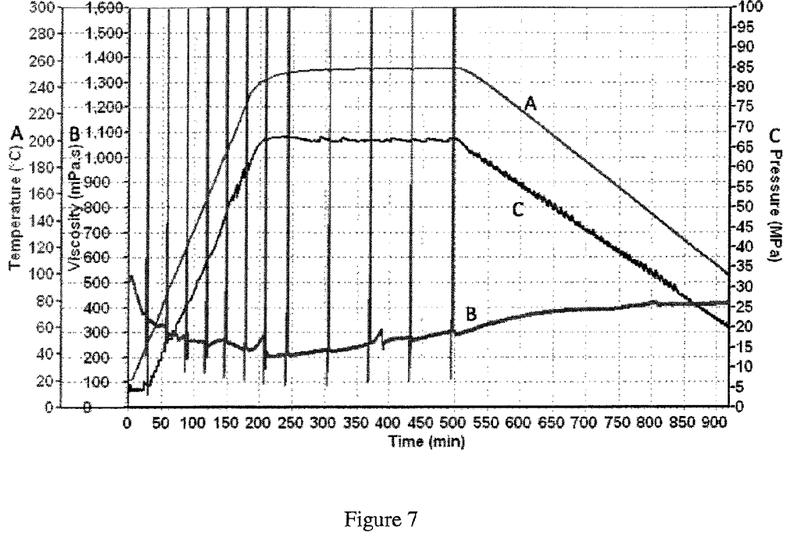
FIG. 7 shows the viscosity versus time and temperature for a spacer fluid in which the particulate materials comprised calcium carbonate, barite and bentonite. The fluid further comprised a mutual solvent and a surfactant.

The rheological properties of the spacer were measured at 254° C. and 69 MPa (10,000 psi) using a Chandler 7600 rheometer and the RIBS geometry. The heat up time was about 4 hours, and the spacer remained at this temperature for 45 minutes. The viscosity was continuously recorded at 100 RPM, corresponding to a shear rate of 84 s$^{-1}$. The viscosity curve is shown in FIG. 7. These data show that the viscosity of the spacer decreased during the heating period, and then did not change significantly with time when the spacer remained at 254° C. and 69 MPa (10,000 psi).

Figure 8:
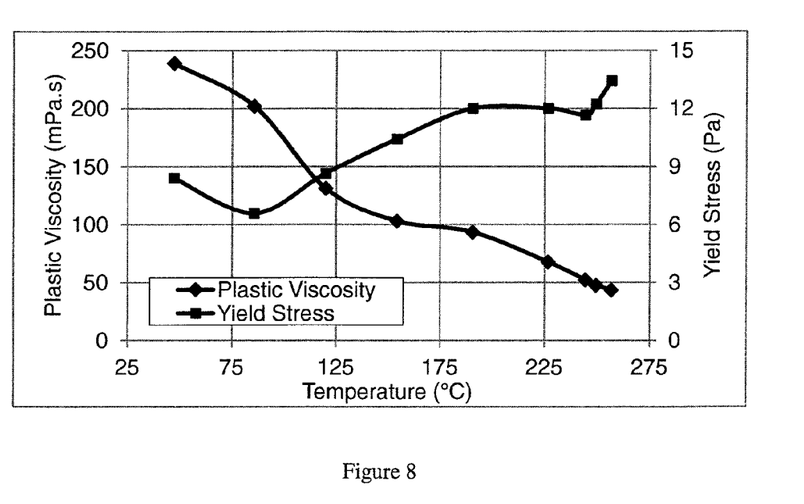
FIG. 8 shows the plastic viscosity and yield stress versus temperature of the spacer fluid of FIG. 7.
Figure 9:
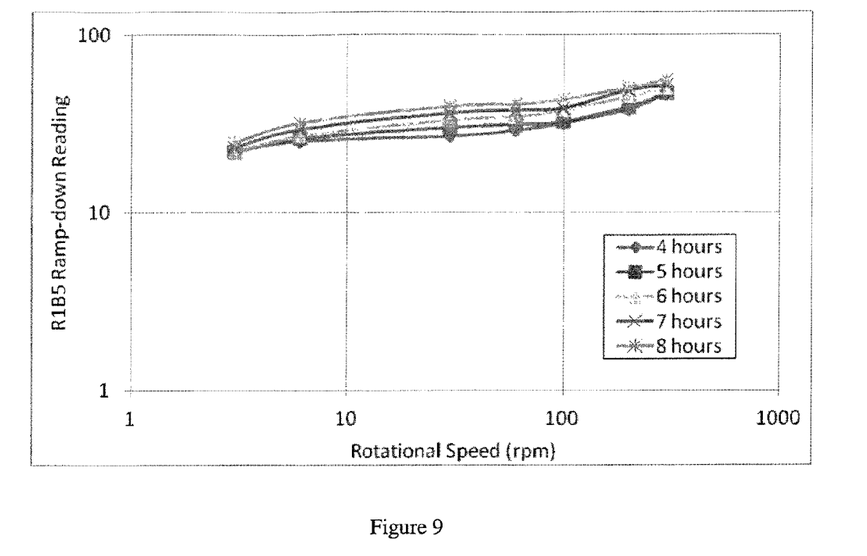
FIG. 9 shows the rheological behavior of the spacer fluid of FIG. 7 during an 8-hour heating period at 254° C. and 69 MPa.

The rheological properties were measured after different times (corresponding to the vertical lines on the viscosity curve in FIG. 7), and the rheological parameters (i.e., the plastic viscosity and yield stress) were calculated using the Bingham plastic model. The evolution of these parameters as a function of temperature is shown in FIG. 8. The plastic viscosity continuously decreased during the heating period. The yield stress varied from about 6.7 Pa (14 lbf/100 ft$^2$) to about 13.4 Pa (28 lbf/100 ft$^2$), depending on the temperature. At 254° C. the plastic viscosity was about 45 mPa-s (45 cP) and the yield stress was about 13.4 Pa (28 lbf/100 ft$^2$). The rheological properties did not change significantly when the spacer remained for 4 hours at 254° C. and 69 MPa (10,000 psi) (FIG. 9).

Example 4

A blend composed of 50% BVOB (by volume of blend) crystalline silica (median particle size of 154 μm), 30% BVOB crystalline silica (median particle size of 25 μm), and 20% BVOB barite (median particle size of 1.5 μm) was prepared. 0.4% BWOB (by weight of blend) bentonite was added to this blend.

A fluid containing fresh water, 1.7 L/tonne of blend of antifoam agent (polypropylene glycol), 33.4 L/tonne of blend of an aqueous solution containing 25% by weight of polystyrene sulfonate (Versa-TL™ 501 available from Akzo Nobel), 25 L/tonne of blend of mutual solvent (ethylene glycol monobutyl ether), and 25 L/tonne of blend of surfactant (EZEFLO™ from Schlumberger) was prepared.

TABLE 6

Rheological data after mixing and after a 20-minute conditioning period at 85° C.

| | Speed | | | | | | |
|---|---|---|---|---|---|---|---|
| | 300 RPM | 200 RPM | 100 RPM | 60 RPM | 30 RPM | 6 RPM | 3 RPM |
| At 25° C. | 215 | 155 | 88 | 59 | 34.5 | 11 | 7.5 |
| At 85° C. | 141 | 103 | 62 | 43 | 27 | 11 | 8.5 |

The amount of free fluid and the density gradient (difference between the density at the top of the cell and the density at the bottom of the cell divided by the average density) were measured after 2 hours at 85° C. Results are reported in Table 7. These results show that the spacer was stable at 85° C.

TABLE 7

Free fluid and density gradient at 85° C.

| Free Fluid (%) | Density Gradient (%) |
|---|---|
| 0 | 0 |

The solid blend was mixed with the fluid at a solid volume fraction of 0.50. The spacer was agitated for 35 seconds at 12,000 RPM using a Waring blender (ISO/API procedure for mixing cement slurries). The density of the spacer was 1995 kg/m$^3$ (16.65 lbm/gal).

The rheological properties of the spacer were measured after mixing (at 25° C.) and after a 20-minute conditioning period at 85° C. in an atmospheric consistometer rotating at 150 RPM. A Chan 35™ rheometer was used. The RIBS geometry was necessary due to the presence of coarse particles. The results, shown in Table 8, show that the spacer was well dispersed after mixing and after the 20-minute conditioning period at 85° C. No settling was noted at the bottom of the rheometer cup.

TABLE 8

Rheological data after mixing and after a 20-minute conditioning period at 85° C.

| | Speed | | | | | | |
|---|---|---|---|---|---|---|---|
| | 300 RPM | 200 RPM | 100 RPM | 60 RPM | 30 RPM | 6 RPM | 3 RPM |
| At 25° C. | 158 | 110 | 61 | 39 | 21 | 6 | 4 |
| At 85° C. | 90 | 58 | 33.5 | 22.5 | 13.5 | 4.5 | 3 |

The amount of free fluid and the density gradient (difference between the density at the top of the cell and the density at the bottom of the cell divided by the average density) were measured after 2 hours at 85° C. The results, reported in Table 9, indicate that the spacer was very stable at 85° C.

TABLE 9

Free fluid and density gradient at 85° C.

| Free Fluid (%) | Density Gradient (%) |
|---|---|
| 0 | 0 |

The density gradient was also measured at 260° C. after conditioning the spacer in a stirred fluid-loss cell. The heat-up time was 90 minutes, and the spacer remained at the test temperature for 45 minutes (30 minutes under agitation at 150 RPM and then 15 minutes under static condition). The spacer was left under static condition during the cooling period, and the density gradient was measured. The density gradient was 4.1%, showing that the stability of the spacer conditioned for 45 minutes at 260° C. was acceptable.

Figure 10:
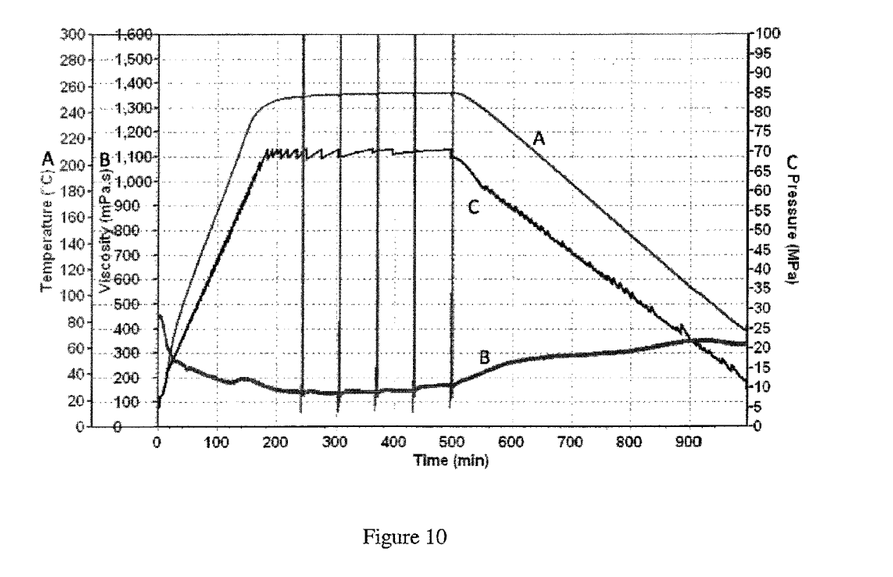
FIG. 10 shows the viscosity versus time and temperature for a spacer fluid in which the particulate materials comprised crystalline silica, barite and bentonite. The fluid further comprised a mutual solvent and a surfactant.

The rheological properties of the spacer were measured at 254° C. and 69 MPa (10,000 psi) using a Chandler 7600 rheometer and the RIBS geometry. The heat-up time was about 4 hours, and the spacer was left for 4 hours at this temperature. The viscosity was continuously recorded at 100 RPM, corresponding to a shear rate of 84 $s^{-1}$. The viscosity curve is shown in FIG. 10. These data show that the viscosity of the spacer decreased during the heating period, and then did not change significantly with time when the spacer was left for 4 hours at 254° C. and 69 MPa (10,000 psi).

Example 5

Two particle blends composed of 50% BVOB (by volume of blend) crystalline silica (median particle size of 154 μm), 30% BVOB barite (median particle size of 17 μm), and 20% BVOB barite (median particle size of 1.5 μm) were prepared. Two spacer fluids were prepared—each containing a different polystyrene sulfonate (Versa-TL™ 70 or Versa-TL™ 502, both available from Akzo Nobel). The average molecular weights of Versa-TL™ 70 and Versa-TL™ 502 are 75,000 and 1,000,000 Daltons, respectively. The fluids also contained fresh water, antifoam agent (polyproplyene glycol), bentonite, mutual solvent (ethylene glycol monobutyl ether) and a surfactant (EZEFLO™ available from Schlumberger). The proportions of ingredients to prepare 1 $m^3$ of spacer fluid are shown in Table 10.

TABLE 10

Spacer-fluid Compositions (to prepare 1 $m^3$)

| fresh water (L) | 423.3 |
|---|---|
| antifoam agent (L) | 4.76 |
| bentonite (kg) | 4.22 |
| styrene sulfonate polymer (Versa-TL 70 or Versa-TL 502) (kg) | 10.55 |
| mutual solvent (L) | 23.81 |
| surfactant (L) | 23.81 |
| particle blend (kg) | 1,797 |

The solid blend was mixed with the fluid at a solid volume fraction of 0.52. The density of the spacer was 2281 kg/$m^3$ (19.04 lbm/gal). A Waring blender was used to prepare the spacers. The bentonite was pre-hydrated for 2 minutes at 4,000 RPM in fresh water containing the antifoam agent. The polymer was then added to the mix fluid and pre-hydrated for 2 minutes at 4,000 RPM. The mutual solvent and surfactant were added next, followed by the particle blend. The particle blend was added in about 30 seconds at 4,000 RPM. The resulting spacer fluid was then mixed for 35 seconds at 12,000 RPM.

The rheological properties of the spacer were measured after mixing (at 25° C.) and after a 20-minute conditioning period at 85° C. in an atmospheric consistometer rotating at 150 RPM. A Chan 35™ rheometer was used. The RIBS rotor/bob geometry was necessary due to the presence of coarse particles. Results are presented in Table 11 for the spacer fluid containing Versa-TL™ 70 and in Table 12 for the spacer fluid containing Versa-TL™ 502.

TABLE 11

Rheological data for spacer fluid containing Versa-TL ™ 70 after mixing and after a 20-minute conditioning period at 85° C.

| | Speed | | | | | | |
|---|---|---|---|---|---|---|---|
| | 300 RPM | 200 RPM | 100 RPM | 60 RPM | 30 RPM | 6 RPM | 3 RPM |
| At 25° C. | 172 | 128 | 77 | 53 | 33 | 12 | 9 |
| At 85° C. | 104 | 77 | 47 | 33 | 20.5 | 7.5 | 5.5 |

TABLE 12

Rheological data for spacer fluid containing Versa-TL ™ 502 after mixing and after a 20-minute conditioning period at 85° C.

| | Speed | | | | | | |
|---|---|---|---|---|---|---|---|
| | 300 RPM | 200 RPM | 100 RPM | 60 RPM | 30 RPM | 6 RPM | 3 RPM |
| At 25° C. | 181 | 136 | 81 | 56 | 34 | 12.5 | 9 |
| At 85° C. | 112 | 82 | 49 | 34 | 21 | 7.5 | 5.5 |

These results show that the spacers were well dispersed after mixing and after the 20-minute conditioning period at 85° C. No settling was noted at the bottom of the rheometer cup.

The amount of free fluid and the density gradient (difference between the density at the top of the cell and the density at the bottom of the cell divided by the average density) were measured after 2 hours at 85° C. The fluid loss was measured at 232° C. and 6.9 MPa using a stirred fluid-loss cell equipped with a 325-mesh screen (90-min heat-up time). Results are reported in Table 13.

TABLE 13

Free fluid and density gradient at 85° C., and fluid loss at 232° C.

| Polymer | Free Fluid (%) | Density Gradient (%) | ISO/API Fluid Loss (mL/30 min) |
|---|---|---|---|
| Versa-TL ™ 70 | 0 | 0.4 | 48 |
| Versa-TL ™ 502 | 0 | 0.1 | 40 |

The results show that the spacer was very stable at 85° C. The fluid loss was low, demonstrating that the polystyrene sulfonates remain effective at this temperature.

Figure 11:
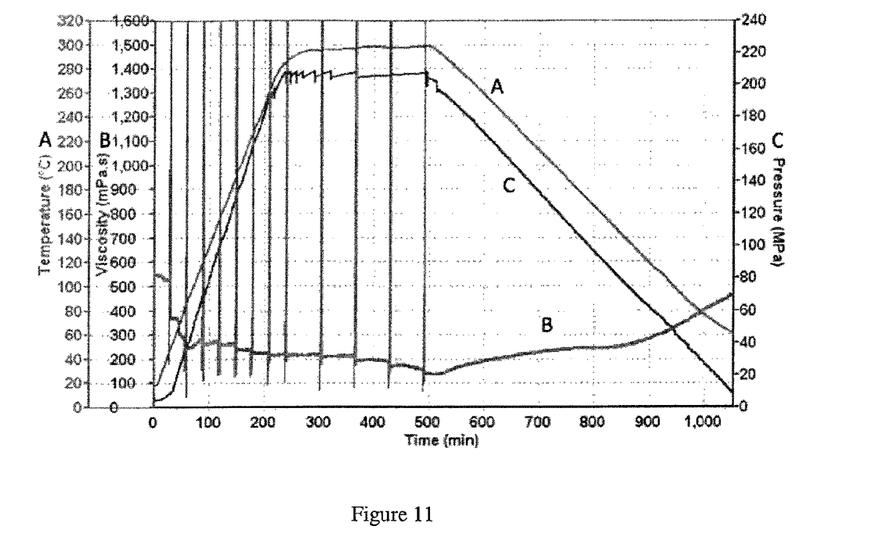
FIG. 11 shows the viscosity versus time and temperature for a spacer fluid in which the particulate materials comprised crystalline silica, barite and bentonite. The fluid further comprised a mutual solvent, a surfactant and water soluble polymer Versa-TL™ 70.
Figure 12:
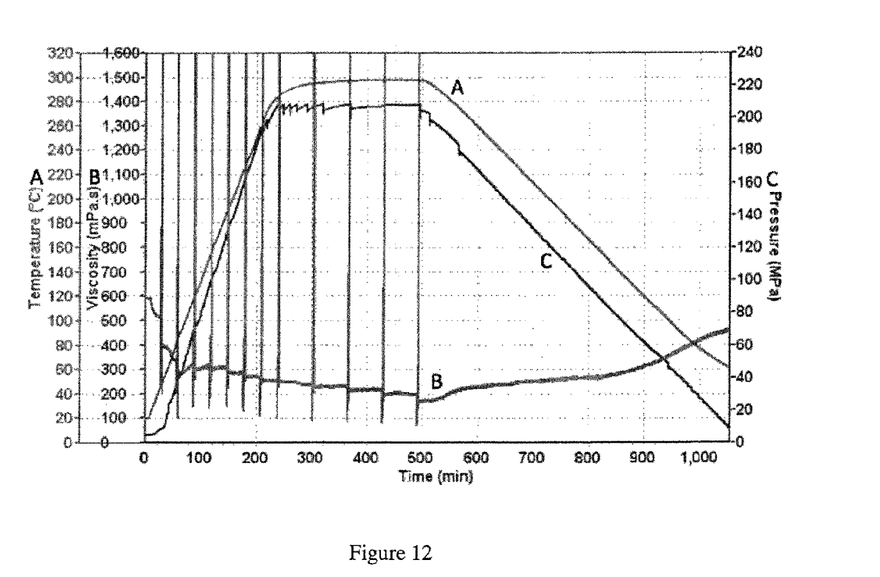
FIG. 12 shows the viscosity versus time and temperature for a spacer fluid in which the particulate materials comprised crystalline silica, barite and bentonite. The fluid further comprised a mutual solvent, a surfactant and water soluble polymer Versa-TL™ 502.

The rheological properties of the spacer fluids were measured at 296° C. and 207 MPa (30,000 psi) using a Chandler 7600 rheometer using the RIBS geometry. The heat up time was about 4 hours, and the spacer remained at this temperature for 4 hours. The viscosity was continuously recorded at 100 RPM, corresponding to a shear rate of 84 $s^{-1}$. The viscosity curves are shown in FIGS. 11 (Versa-TL™ 70) and 12 (Versa-TL™ 502). These data show that the viscosity of the spacer decreased during the heating period, and then did not change significantly with time.

Figure 13:
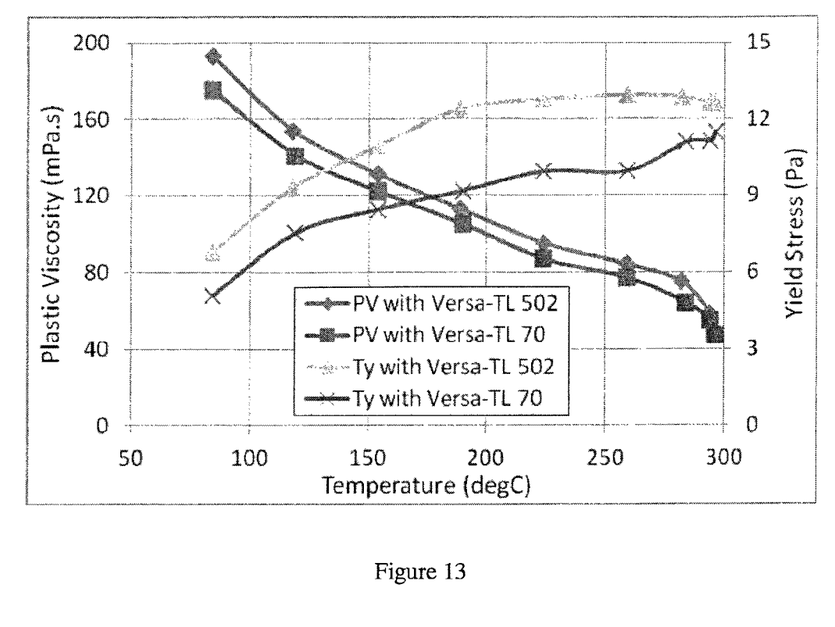
FIG. 13 shows the plastic viscosity and yield stress versus temperature of the spacer fluids of FIGS. 11 and 12.

The rheological properties were measured after different times, corresponding to different temperatures. These measurements corresponded to the vertical lines on the viscosity curves from FIGS. 11 and 12. The rotational speed was varied: 300, 200, 100, 60, 30, 6 and 3 RPM, corresponding to different shear rates. The reading at each shear rate was recorded. From these readings, the plastic viscosity and yield stress were calculated using the Bingham plastic model. The evolution of these parameters as a function of temperature is shown in FIG. 13.

The evolution of the plastic viscosity and yield stress was comparable for the two polymers. The plastic viscosity decreased and the yield stress increased as a function of temperature. However, the rheological properties were adequate throughout the temperature range.

Although various embodiments have been described with respect to enabling disclosures, it is to be understood that this document is not limited to the disclosed embodiments. Variations and modifications that would occur to one of skill in the art upon reading the specification are also within the scope of the disclosure, which is defined in the appended claims.

The invention claimed is:

1. A method for cementing a borehole in a subterranean well, wherein the borehole is initially filled with a drilling fluid, comprising:
   (i) preparing a spacer fluid consisting essentially of water, a polystyrene sulfonate present at a single molecular weight, a clay mineral, a mutual solvent, one or more surfactants, and a mixture of particulate materials, wherein the particulate materials are chosen such that the mixture has at least a trimodal particle-size distribution;
   (ii) pumping the spacer fluid into the well such that it displaces the drilling fluid; and
   (iii) pumping a cement slurry into the well such that it displaces the spacer fluid,
   wherein the polystyrene sulfonate present at the single molecular weight disperses the particulate materials, increases spacer fluid viscosity and provides fluid-loss control of the spacer fluid at temperatures up to 260° C., and the spacer fluid maintains stable rheological properties for at least 4 hours at 254° C.

2. The method of claim 1, wherein the molecular weight of the single polystyrene sulfonate is between 75,000 Daltons and 6,000,000 Daltons.

3. The method claim 1, wherein the particulate materials comprise a combination of silica and barite, or a combination of calcium carbonate and barite.

4. The method of claim 1, wherein a first particulate material has an average particle size between about 100 and 300 μm, a second particulate material has an average particle size between about 10 and 30 μm, and a third particulate material has an average particle size between about 1 and 3 μm.

5. The method of claim 1, wherein the spacer-fluid density is higher than or equal to about 1920 kg/m³.

6. The method of claim 1, wherein the well has a circulating temperature higher than about 150° C.

7. The method of claim 1, wherein the solid volume fraction in the spacer fluid is between about 0.50 and 0.55.

8. The method of claim 1, wherein the polystyrene-sulfonate concentration in the spacer fluid is between 0.6% and 5.0% by weight of water.

9. A method for fluid displacement in an annulus, wherein the annulus is initially filled with a first fluid, comprising:
   (i) preparing a second fluid consisting essentially of water, a clay mineral, a mutual solvent, one or more surfactants, a polystyrene sulfonate present at a single molecular weight, and a mixture of particulate materials, wherein the particulate materials are chosen such that the mixture has at least a trimodal particle-size distribution; and
   (ii) pumping the second fluid into the annulus such that it displaces the first fluid,
   wherein the polystyrene sulfonate present at the single molecular weight disperses the particulate materials, increases spacer fluid viscosity and provides fluid-loss control of the spacer fluid at temperatures up to 260° C., and the spacer fluid maintains stable rheological properties for at least 4 hours at 254° C.

10. The method of claim 9, wherein the molecular weight of the single polystyrene sulfonate is between 75,000 Daltons and 6,000,000 Daltons.

11. The method claim 9, wherein the particulate materials comprise a combination of silica and barite, or a combination of calcium carbonate and barite.

12. The method of claim 9, wherein a first particulate material has an average particle size between about 100 and 300 µm, a second particulate material has an average particle size between about 10 and 30 µm, and a third particulate material has an average particle size between about 1 and 3 µm.

13. The method of claim 9, wherein the spacer-fluid density is higher than or equal to about 1920 kg/m$^3$.

14. The method of claim 9, wherein the well has a circulating temperature higher than about 150° C.

15. The method of claim 9, wherein the solid volume fraction in the spacer fluid is between about 0.50 and 0.55.

16. The method of claim 9, wherein the polystyrene-sulfonate concentration in the spacer fluid is between 0.6% and 5.0% by weight of water.

* * * * *